(12) United States Patent  
Chowdhary et al.

(10) Patent No.: US 10,302,434 B2  
(45) Date of Patent: May 28, 2019

(54) METHOD AND APPARATUS FOR DETERMINING WALKING DIRECTION FOR A PEDESTRIAN DEAD RECKONING PROCESS

(71) Applicant: CSR Technology Inc., Sunnyvale, CA (US)

(72) Inventors: Mahesh Chowdhary, San Jose, CA (US); Manish Sharma, Noida U.P. (IN); Arun Kumar, New Delhi (IN); Sankalp Dayal, Meerut U.P. (IN); Mahaveer Jain, Rajastrian (IN)

(73) Assignee: CSR TECHNOLOGY, INC., Sunnyvale, CA (US)

( * ) Notice: Subject to any disclaimer, the term of this patent is extended or adjusted under 35 U.S.C. 154(b) by 1117 days.

(21) Appl. No.: 13/682,684

(22) Filed: Nov. 20, 2012

(65) Prior Publication Data

US 2014/0142885 A1 May 22, 2014

(51) Int. Cl.
*G01C 21/12* (2006.01)
*G06F 15/00* (2006.01)
*G01C 21/16* (2006.01)
*G01C 21/20* (2006.01)

(52) U.S. Cl.
CPC ............ *G01C 21/12* (2013.01); *G01C 21/16* (2013.01); *G01C 21/20* (2013.01); *G06F 15/00* (2013.01)

(58) Field of Classification Search
CPC ........ G01C 21/12; G01C 21/16; G01C 21/20; G06F 15/00
See application file for complete search history.

(56) References Cited

U.S. PATENT DOCUMENTS

| | | | |
|---|---|---|---|
| 8,578,773 B1 | 11/2013 | Feng et al. | |
| 2008/0105065 A1 | 5/2008 | Lee et al. | |
| 2011/0029277 A1 | 2/2011 | Chowdhary et al. | |
| 2011/0077903 A1* | 3/2011 | Lee | G06F 1/1626 702/151 |
| 2012/0016624 A1 | 1/2012 | Caritu | |
| 2012/0072166 A1* | 3/2012 | Keal | G01C 21/165 702/150 |
| 2012/0268376 A1* | 10/2012 | Bi | G06F 3/0425 345/168 |
| 2012/0303271 A1 | 11/2012 | Chowdhary et al. | |
| 2013/0138388 A1* | 5/2013 | Jain | G01P 15/00 702/141 |

FOREIGN PATENT DOCUMENTS

JP 2011-149923 8/2011

OTHER PUBLICATIONS

Search Report dated Apr. 7, 2014 in corresponding GB1317790.2.

* cited by examiner

*Primary Examiner* — Mohamed Charioui
*Assistant Examiner* — Jeremy A Delozier
(74) *Attorney, Agent, or Firm* — Thien T. Nguyen (57) ABSTRACT

The present invention relates generally to position determination, and more particularly to methods and apparatuses to determine the walking direction (heading of a user) using MEMS inertial sensors commonly found in mobile devices such as cellphones. According to some aspects, the invention includes a methodology to allow the walking angle to be determined dynamically. In embodiments, the methodology includes pattern matching accelerometer measurement data to a reference acceleration pattern.

28 Claims, 6 Drawing Sheets

METHOD AND APPARATUS FOR DETERMINING WALKING DIRECTION FOR A PEDESTRIAN DEAD RECKONING PROCESS

FIELD OF THE INVENTION

The present invention relates generally to position determination, and more particularly to methods and apparatuses to determine the walking direction of a user associated with a mobile device such as a cellular phone.

BACKGROUND OF THE INVENTION

Many conventional mobile devices such as cellular phones include a digital compass that provides a heading of the device that can be useful for applications such as navigation. However, the actual heading of the device may not be the heading that is needed for all applications. For example, when a mobile device is placed in a holder that is mounted in a fixed tilt angle in a car, the heading that is of interest is the heading of the movement of the car, and not the device itself. Certain techniques have been developed to produce the tilt compensated heading of the mobile device through use of MEMS magnetic sensor and accelerometer. However, these techniques are not useful for obtaining a heading direction in all applications, such as when a mobile device is being held by a person who is walking.

SUMMARY OF THE INVENTION

The present invention relates generally to position determination, and more particularly to methods and apparatuses to determine the ambulatory motion (e.g. walking) direction (i.e. heading) of a user using MEMS inertial sensors commonly found in mobile devices such as cellphones. According to some aspects, the invention includes a methodology to allow the walking angle to be determined dynamically. In embodiments, the methodology includes pattern matching measurement data to a reference pattern. According to other aspects, the invention includes methods to scientifically classify the walking pattern of a person with respect to a set of reference patterns and adjust parameters to predict the walking angle accurately when device placement position is unknown and walking context is identified. According to further aspects, the invention includes methods to scientifically identify the number of reference patterns needed to model the walking motions of a set of individuals, and to match an individual with a reference pattern. According to still further aspects, the invention includes methods to adjust/customize an originally chosen reference pattern for an individual dynamically as a function of time.

In accordance with these and other aspects, a method according to the invention comprises collecting accelerometer data in a device associated with a person while the person is walking, and processing the accelerometer data to determine a walking angle which is used to determine a heading of the walking person.

In further accordance with these and other aspects, a method according to the invention comprises collecting accelerometer data in devices respectively associated with a plurality of persons while the persons are walking, and processing the accelerometer data to obtain a set of reference patterns.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1A:
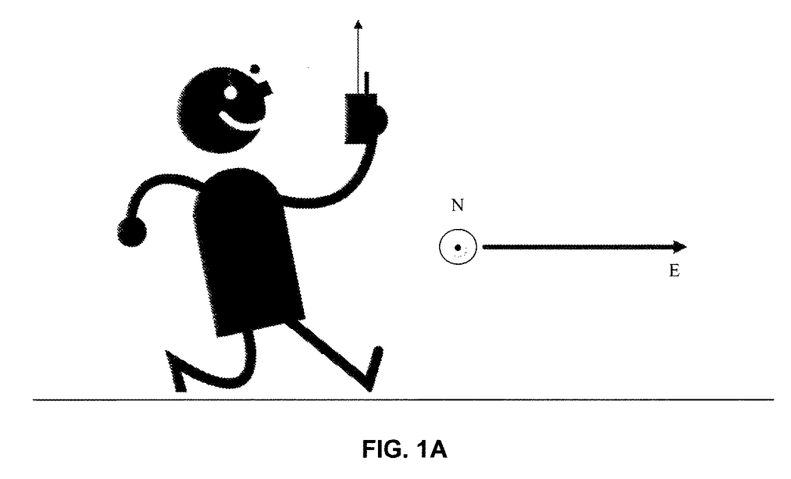
FIGS. 1A to 1C illustrate aspects of determining a walking direction according to embodiments of the invention.

In general, as shown in FIG. 1A, the present inventors recognize that a digital compass in a mobile unit 102 provides a heading that corresponds to the direction of the forward axis 104 of the mobile unit. However, when a person is in ambulatory motion such as walking, jogging, running, etc. the mobile unit can be in any orientation such as being held in a hand, in a shirt pocket, a holster, a backpack, an arm swing, etc. So the compass reading will not necessarily correspond to the person's direction of ambulatory motion.

Meanwhile, if a person's ambulatory motion direction $\psi$ and stride length SL are known, the person's position in the N and E directions at time t can be determined by DR as follows:

$$N_t = N_{t-1} + SL*\cos(\psi)$$

$$E_t = E_{t-1} + SL*\sin(\psi)$$

According to certain aspects, therefore, the invention provides techniques for determining a person's direction of ambulatory motion, which can be, and usually is, different than a direction indicated by a compass in a mobile unit. For ease of illustration, embodiments of the invention will be described in connection with an example ambulatory motion of walking. However, those skilled in the art will appreciate that all ambulatory motions will produce a periodic pattern as described in more detail below in connection with a walking motion. Moreover, those skilled in the art will further understand how to extend the techniques of the invention to such other types of motion after being taught by the present disclosure.

Figure 1B:
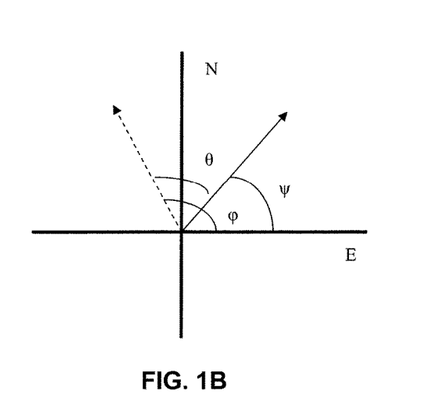

In walking embodiments, the walking direction is obtained by determining the walking angle θ between the forward axis of the mobile unit and the walking direction. This is illustrated in FIG. 1B. By determining the walking angle θ between the heading φ of the forward axis (e.g. obtained from a compass) and the walking direction, the walking direction ψ can be easily obtained as ψ=φ−θ.

Figure 1C:
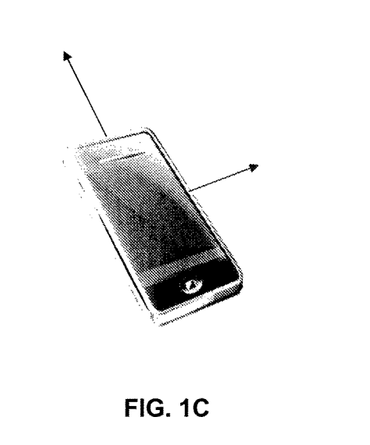

In example embodiments described in more detail below, determination of the waking angle θ is done by analyzing the forward and sideways directions of motion of the user. This is illustrated in FIG. 1C. Many conventional mobile units include accelerometers associated with three dimensions of movement, including forward 106, sideways 108 and vertical 110 movement with respect to the forward axis (compass facing direction) of the mobile unit 102. Embodiments of the invention use measurement data from the accelerometers associated with the forward 106 and sideways 108 directions. Although techniques for determining walking angle will be described in more detail in connection with an example type of measurement data being accelerometer data, the invention is not limited to this type of data. Rather, other types of periodic signals that can be used include velocity or angular rate of turn from a gyroscope, or even a compass heading. Those skilled in the art will be able to understand how to use such additional or alternative types of signals after being taught by the examples herein.

In embodiments of the invention, mobile device 102 is typically any cellular or similar type of telephone (e.g. iPhone, Blackberry, Android smartphone, etc.) with built-in GPS or other positioning functionality. However, many alternatives are possible such as portable or tablet computers (e.g. iPad, Galaxy, etc.), personal navigation devices, etc. GPS functionality in mobile device 102 can be implemented using any combination of hardware and/or software, including GPS chipsets and associated firmware/software such as SiRFstarII, SiRFstar IV or SiRFstar V from CSR Ltd. or BCM4750 from Broadcom Corp., possibly as adapted and/or supplemented with pedestrian dead reckoning functionality in accordance with the present invention, and described in more detail herein.

In addition to the GPS functionality incorporated in device 102 as described above, and as mentioned previously, device 102 includes conventional dead reckoning functionality implemented using sensor devices such as MEMS inertial sensors including accelerometers and gyroscopes, compasses, etc. and associated firmware/software for projecting an estimated position based on a known previous position and sensor outputs. Those skilled in the art will be able to understand how to implement the present invention by adapting and/or supplementing such conventional dead reckoning software or firmware with the pedestrian dead reckoning techniques of the present invention after being taught by the present specification.

Figure 2:
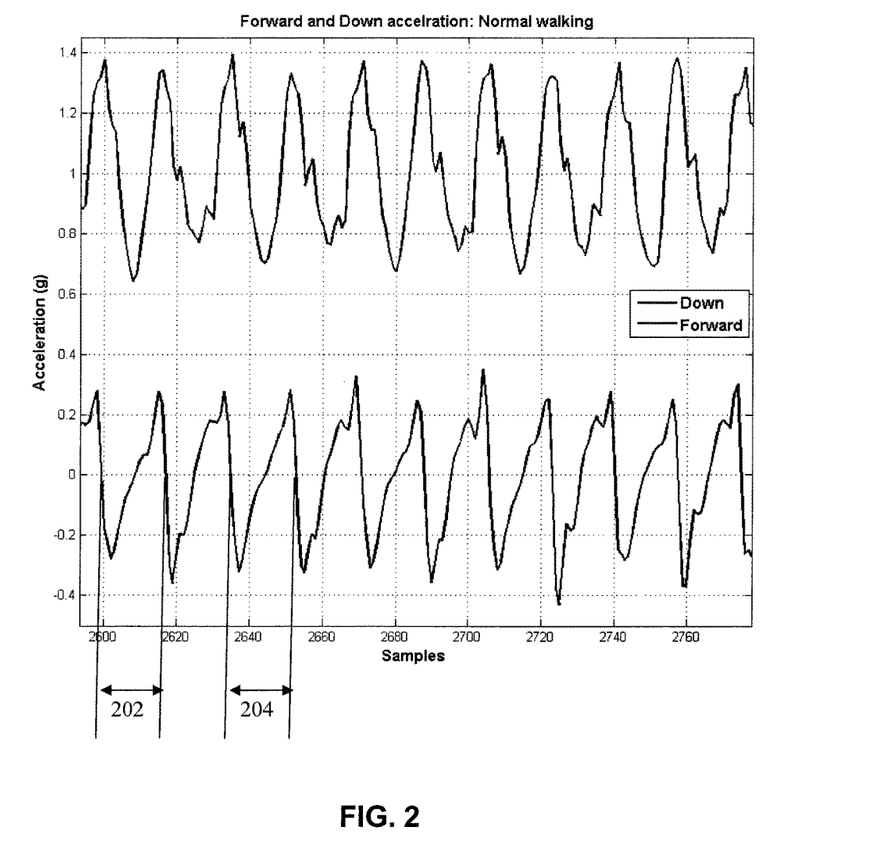
FIG. 2 are diagrams illustrating actual accelerometer measurements obtained while a person is walking and holding a mobile device.

FIG. 2 illustrates examples of actual forward and vertical acceleration patterns during a walking motion, as measured by the respective accelerometers, for example when the mobile device (e.g. mobile phone) is being held in a person's hand.

The present inventors recognize that when a person is walking (or jogging, running, etc.) at a steady pace (which is a typical situation), these patterns are substantially periodic, and typically do not vary substantially from stride to stride. In other words, the pattern in one stride 202 is substantially the same as the pattern in another stride 204. According to certain aspects, therefore, the invention determines a walking angle by only analyzing measurement data for one stride.

To determine the walking angle, embodiments of the invention use a pattern matching process. In general, this process includes matching actual forward and sideways accelerometer measurements to stored accelerometer reference patterns for forward and sideways movement during walking.

In one example matching process according to the invention, $\theta_a$ is defined as the walking angle at which $f(\theta_a)$ that is the covariance between a simulated forward Acceleration (from the stored reference pattern) and a proposed forward acceleration at that walking angle is maximum. This means $$\frac{\partial f(\theta_a)}{\partial \theta_a} = 0,$$

and the second derivative is <0.

Similarly, $\theta_b$ is defined as the walking angle at which $f(\theta_b)$ that is the covariance between the simulated sideways Acceleration (from the stored reference pattern) and proposed sideways acceleration at that walking angle is maximum. This means $$\frac{\partial f(\theta_b)}{\partial \theta_b} = 0,$$

and the second derivative <0.

The proposed sideways and forward accelerations are defined using the actual measurements from the sideways and forward accelerometers, AccX and AccY, respectively, for a given instant i within a stride T and proposed values of $\theta_a$ and $\theta_b$ as follows:

Proposed forward acceleration $Acc[i] = \cos(\theta_a)AccX[i] - \sin(\theta_a)AccY[i]$ Proposed sideways acceleration $Acc[i] = \sin(\theta_b)AccX[i] + \cos(\theta_b)AccY[i]$ $$\frac{\partial f(\theta_a)}{\partial \theta_a} = 0$$

implies that $$\frac{\sum_T simFwdAcc[i](\cos\theta_a AccX[i] - \sin\theta_a AccY[i])}{\partial \theta_a} = 0$$

Where simFwdAcc is the acceleration value from the stored forward acceleration reference pattern and $\Sigma_T$ represents the summation over all stored points within a single stride T associated with the reference pattern.

Hence, $$\tan\theta_a = \frac{-\sum_T simFwdAcc\,[i]AccY[i]}{\sum_T simFwdAcc\,[i]AccY[i]}$$

Similarly, $$\frac{\partial f(\theta_b)}{\partial \theta_b} = 0$$

implies that $$\tan\theta_b = \frac{\sum_T simSideAcc\,[i]AccX[i]}{\sum_T simSideAcc\,[i]AccY[i]}$$

Where simSideAcc is the acceleration value from the stored sideways acceleration reference pattern and $\Sigma_T$ represents the summation over all stored points within a single stride T associated with the reference pattern.

It should be apparent that the values of $\theta_a$ and $\theta_b$ can be readily obtained by performing an arctangent of the associated ratios shown above. The final walking angle $\theta$ can then be computed as either an average or weighted combination of $\theta_a$ and $\theta_b$.

Having derived an example set of equations for finding a walking angle using a pattern matching process, an example process using these equations will now be described in connection with the flowchart illustrated in FIG. 3.

It should be noted that a preliminary and preferred step for the following methodology can include detecting and determining that a person associated with the mobile device is in a walking motion or walking mode (or other type of ambulatory motion for which reference patterns are available). Example techniques that can be used in association with the present invention are described in co-pending and co-owned U.S. application Ser. No. 12/510,965, published as U.S. Publication No. 2011/0029277, titled, "Methods and Applications for Motion Mode Detection for Personal Navigation Systems," the contents of which are incorporated by reference herein in their entirety.

Moreover, the placement of a mobile device on a person's body (e.g. next to an ear, in a holster, in a backpack, etc.) can affect the acceleration pattern detected by the device, and thus can be used to select an appropriate reference pattern to use. Embodiments of the invention can detect the particular placement, for example using techniques described in co-pending and co-owned U.S. application Ser. No. 13/115,940, filed May 25, 2011, titled, "Hierarchical Context Detection Method to Determine Location of a Mobile Device On a Person's Body," the contents of which are incorporated by reference herein in their entirety.

As shown in step S302, the measurement data for the forward and sideways acceleration is obtained for a time period corresponding to one or more strides of walking motion. Stride frequency for normal walking motion is approximately 1 Hz. Data for a minimum of one stride is needed. For optimal performance, data for three strides is preferred. This translates to 50 to 150 data points for a typical accelerometer having a sample rate of 50 Hz.

In a next step S304, a single stride such as 202 and 204 shown in FIG. 2 is identified. The present inventors recognize that the accuracy of the techniques of the invention is affected by the correct identification of the start and the end of a stride. In embodiments, this is accomplished by detecting negative peaks in the vertical acceleration. In some cases, however, the negative peak identification logic misses the correct epoch by one or two samples, and depending on the sampling rate, this offset could be a significant source of error. This results in time shift between simulated and proposed forward acceleration thereby causing an error in the estimate of walking direction angle. To reduce this time shift, in some embodiments, the input signal is upsampled to a higher sampling rate. This upsampled signal is used for detecting a stride and performing further processing.

Next in step S306, the values of $\theta_a$ and $\theta_b$ are determined using the samples in the reference pattern and the corresponding measurement samples from the accelerometers as described in more detail above.

Figure 3:
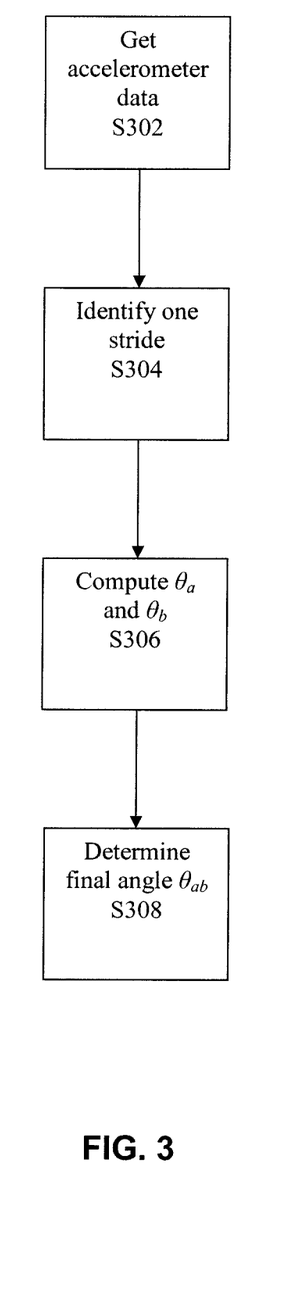
FIG. 3 is a flowchart illustrating an example methodology for determining a walking direction according to embodiments of the invention.

In embodiments such as that shown in FIG. 3, further processing is performed to find the final overall walking angle $\theta_{ab}$. In one embodiment, it is determined as a weighted combination of the determined angles $\theta_a$ and $\theta_b$ as follows:

$$\theta_{ab} = \omega_1\theta_a + \omega_2\theta_b$$

$$= \omega_1 \tan^{-1}\left(\frac{-\sum_T simFwdAcc\,[i]AccY[i]}{\sum_T simFwdAcc\,[i]AccX[i]}\right) +$$

$$\omega_2 \tan^{-1}\left(\frac{\sum_T simSideAcc\,[i]AccX[i]}{\sum_T simSideAcc\,[i]AccY[i]}\right)$$

wherein the weighting coefficients satisfy $\omega_1+\omega_2=1$ and $\omega_1>0$ and $\omega_2>0$.

In embodiments such as those described above, just two stored reference patterns, one each for forward and sideways acceleration, can be used. In some embodiments, the reference pattern includes a plurality of samples for a given stride. In other embodiments, the shapes of the reference acceleration patterns are modeled as a sum of several n sinusoidal (or other orthogonal) components. For example, the acceleration reference pattern can be represented as coefficients of a function with n sinusoidal functions. In example embodiments, n=6 is appropriate, which yields:

Acc Fwd(T)=a1*sin(b1*x+c1)+a2*sin(b2*x+c2)+ a3*sin(b3*x+c3)+a4*sin(b4*x+c4)+a5*sin (b5*x+c5)+a6*sin(b6*x+c6)

where x=f(T), which in embodiments simply corresponds to the sampling frequency used for the accelerometer measurements, T is the stride duration, and $a_i$, $b_i$, $c_i$ are stored model parameters. The sideways acceleration reference pattern can be represented similarly.

In embodiments of a positioning device such as a GPS navigation device in a smartphone, for example, there can be a set of up to twenty stored reference patterns on the device, comprising five user patterns for four different body positions (e.g. next to an ear, in a holster, in a backpack, in a trouser pocket). These reference patterns can be updated periodically by a server computer and downloaded to the device. Alternatively, the reference patterns can be fixed. In embodiments, the two reference patterns to be used in the pattern matching process described above are selected from the stored set of reference patterns for a given user by collecting data for a few strides from the user and performing a classification process as described below in connection with FIG. 6.

The present inventors recognize that even though the acceleration waveforms for all normal persons will share some commonalities (because walking is a universal movement), there can be subtle variations between the shape of the stride in the reference patterns and an actual stride for an individual user. One aspect of these variations is illustrated in FIG. 4.

Figure 4:
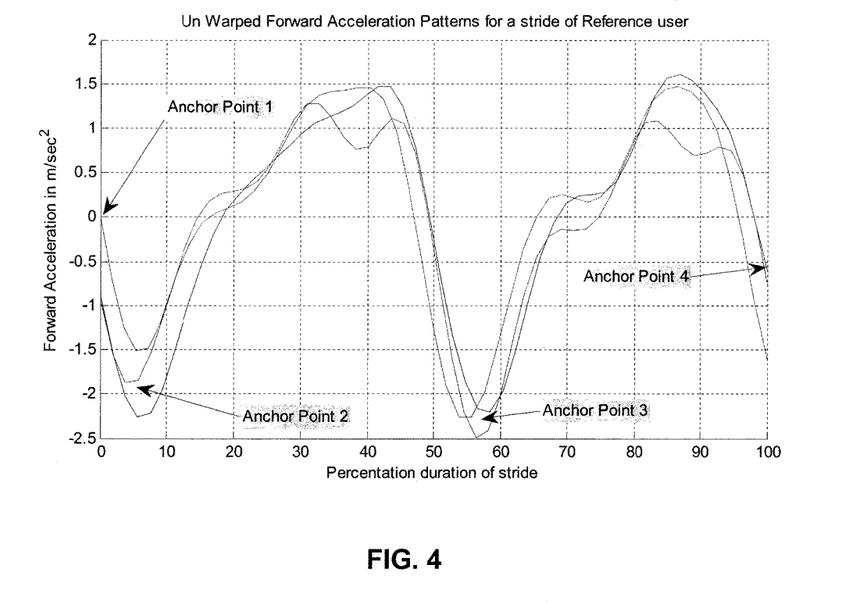
FIG. 4 is a diagram illustrating aspects of variations and similarities of acceleration patterns for a stride.

As shown in FIG. 4, the acceleration waveform for all normal persons will have four anchor points in each stride, corresponding to motions associated with lifting and dropping each leg. However, the positions of certain anchor points within a stride, particularly the second and third anchor points shown in FIG. 4, will be slightly different for each individual user. For example, FIG. 4 shows how the locations of these anchor points occur at slightly different locations within a stride for three different persons.

According to certain aspects of the invention, for better matching the acceleration, a dynamic time warping (DTW) technique is applied. This will be described in connection with the flowchart of FIG. 5.

Figure 5:
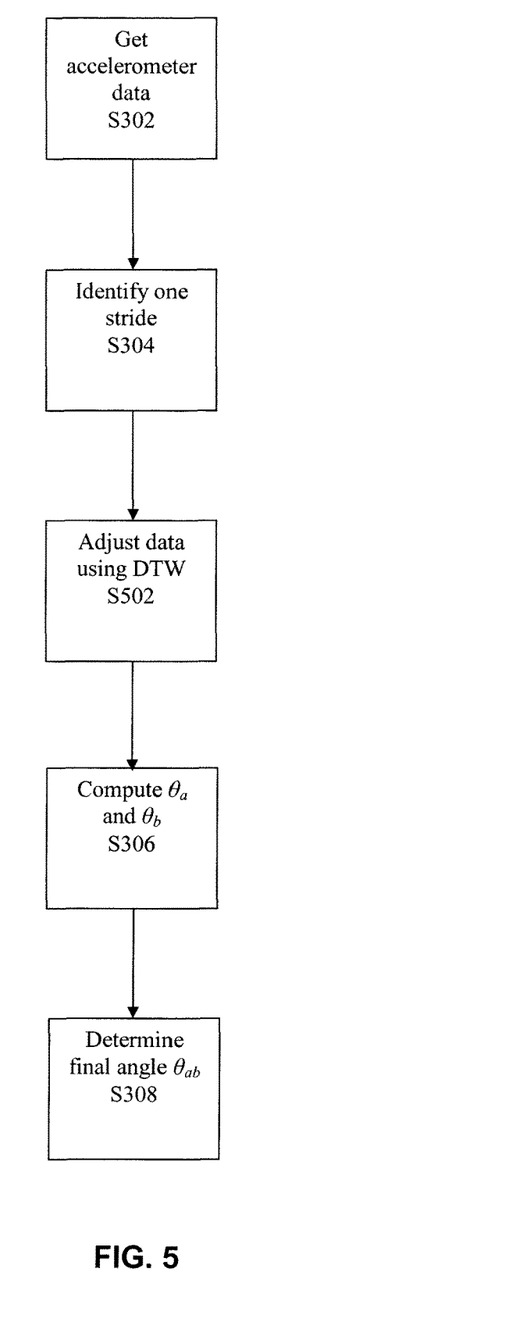
FIG. 5 is a flowchart illustrating another example methodology for determining a walking direction according to embodiments of the invention.

As can be seen, FIG. 5 includes the same steps as the flowchart in FIG. 3, except that it further includes a step S502 of performing DTW on the acceleration measurements before performing the process of determining walking direction angle, as described above. In step S502, the four anchors points are identified in the reference acceleration pattern, as shown in FIG. 4. The first and fourth anchor points correspond to the start and end of the stride respectively, and are left unchanged. The second and third anchor points correspond to the minima near 5% and 55% percentage duration of stride respectively. Piece wise time warping is applied on the measurement data for the acceleration pattern in the regions between the first and second, second and third, and third and fourth anchor points such that the locations of the second and third anchor points in the measurement data after warping correspond with the locations of the second and third anchor points in the stored reference pattern.

Example aspects of identifying and forming reference patterns for use in the above described pattern matching process will now be described in more detail, including an example vector clustering technique according to embodiments of the invention, as described in more detail herein below.

The present inventors have observed that acceleration patterns for different people are different. In the above pattern matching process, such differences can result in poor performance if the person's actual acceleration pattern is drastically different from the expected or reference acceleration pattern. Hence a vector clustering method according to embodiments of the invention uses data driven techniques where a dictionary or a set of reference acceleration patterns is created from a large amount of data collected from different users, as will now be described in connection with the flowchart in FIG. 6.

Figure 6:
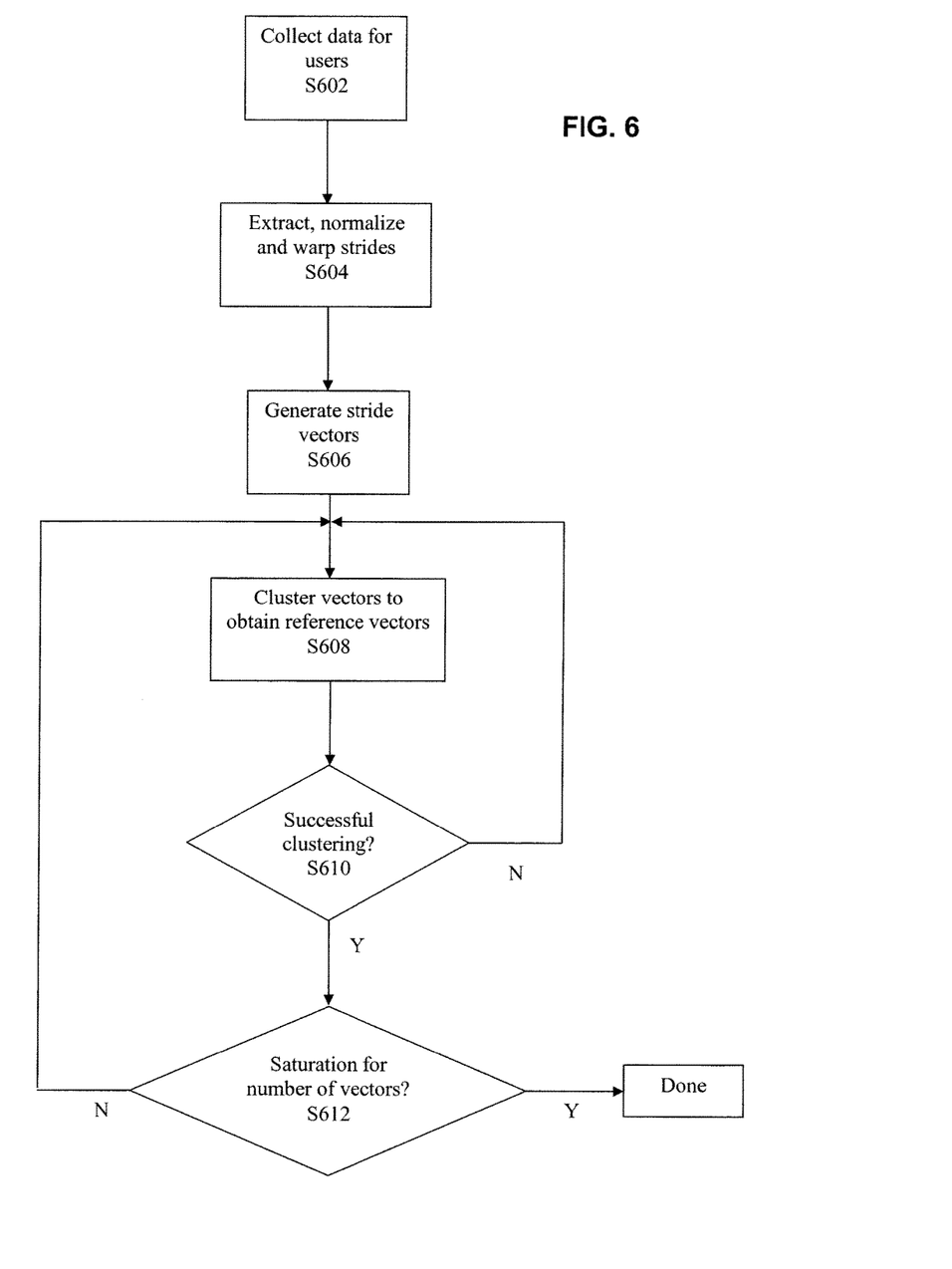
FIG. 6 is a flowchart illustrating an example methodology for forming reference patterns according to embodiments of the invention.

As shown, in step S602, data for multiple users for multiple strides is collected. The user group is preferably diverse and consists of men, women, and users of different heights. In embodiments, data for multiple body positions (e.g. next to an ear, in a backpack, etc.) is also collected and used to form different sets of reference patterns. In additional or alternative embodiments, data for multiple types of ambulatory motion (e.g. walking, jogging, running) is also collected and used to form different sets of reference patterns.

Next, in step S604, acceleration data in each stride from each user is extracted and normalized on a scale from 0 to 100. Next, in some embodiments, dynamic time warping is applied to the input signal with a common reference pattern. This aligns the peaks (anchor points) at 5% and 55% for all the acceleration patterns of each stride.

Next, in step S606, in these scaled and warped acceleration values for a given stride, values at $\{0,2,4, \ldots 100\}$ are taken. These 51 values form the values of the 51 dimensions of a stride vector. This step results in multiple 51-dimension vectors being generated, one each for every stride of every user.

In step S608, the vectors are clustered using a Linde-Buzo-Gray (LBG) algorithm. The optimizing function or the distance is considered as the correlation coefficient. The steps in the clustering are as follows. For the initial run, three final reference vectors are obtained as follows:

(a) A correlation coefficient is calculated between every vector. From these correlation values, the minimum value is obtained. This corresponds to two vectors; it may be referred to as Centroid(vectors1,2).

(b) Now with every centroid, a vector covariance of all the other remaining vectors is calculated. The vector that has minimum correlation coefficient from the Centroid(vectors 1,2) is identified and named as Centroid(vectors 3). This exercise is repeated until the centroid vectors equal to the total number of reference vectors (initially three) is obtained.

(c) Using the centroid vectors, clustering is performed. In clustering, every remaining vector is considered one at a time. The covariance is calculated between each remaining vector and each centroid. It is classified into a set corresponding to the centroid vector with which it has maximum covariance. This exercise is repeated for every vector except the vectors corresponding to the centroids themselves.

(d) An average of all the covariance values obtained during clustering in step (c) is calculated. This is used to monitor the performance of the clustering process.

(e) After clustering, a centroid is calculated from each set of classified vectors (initially three sets). The centroid is calculated by taking an average along every dimension. This gives rise to new centroid vectors (initially three).

(f) The process from step c) through e) is repeated for 500 iterations.

A new run is performed by increasing the number of reference vectors by one and by repeating (a) through (f) above.

In step S610, the average covariance value from step (d) above is observed. First, for every run, average correlation coefficient values for each iteration are observed. The curve for average correlation coefficient versus number of iterations should saturate for a successful clustering. In other words over the last iterations of step (d), the average correlation coefficient values should not vary by much (e.g. less than about 0.1). Otherwise, the number of iterations is preferably increased and the clustering is performed again by returning to step S610.

In step S612, once clustering is successful as determined in step S612, the average correlation coefficient for the final iteration of a given run versus the number of reference vectors is observed. This curve should also saturate. The value of number of reference vectors at which the curve saturates is considered as the final number of reference vectors and the centroid vectors generated during this run are considered as the final reference vectors.

Curve fitting is performed on every centroid vector and the 18 coefficients $a_i$, $b_i$, $c_i$, as described above are obtained and stored as the set of reference patterns.

The present inventors recognize that because acceleration patterns relating to the walking motion of different users are not identical, they need to be modeled separately. At the same time, each pattern is not unique in itself. If there are a large number of patterns, this would imply a large modeling overhead. Hence, embodiments of the invention cluster different patterns to give a set of reference patterns to be used for pattern matching. For every update of the set of patterns, classification is performed on the basis of the correlation coefficients obtained for each vector from all the centroids in a very large dimensional-space. For the classified sets, a new centroid is calculated as an average of all the vectors in time. The new centroids are added in the set of the learning vectors and again classification is done.

In one example of forming a set of reference patterns, acceleration data for 10 users during normal walking movement was collected and normalized for an equal duration (0-100). Duration from 0 to 100 was distributed into 51 instances giving rise to 51 dimension vector for each stride. In this 51 dimension vector space, clustering was done using Linde-Buzo-Gray (LBG) vector quantization algorithm with covariance as the distance rather than LMS as described above.

After each iteration, clustered vectors are averaged which act as centroids for next iteration. Test data indicates that about 500 iterations typically saturate the correlation coefficient. Initially five vectors were used to start the iterative process described in connection with step S608 above. The first two initial vectors were taken as the set whose correlation coefficients are minimum. The next three initial vectors are obtained as ones with minimum average correlation value taken iteratively with two and then three and four initial vectors. The iteration provided with five initial vectors.

Walk tests were conducted where the mobile device was placed at different walking angles. Walking angle determined through the above mentioned technique was compared with the actual values of walking angle for each test. Results of these tests are described for two users in tables below.

TABLE 1

Walk test data for User 1

| Walking Angle From Apparatus | Walking Angle using Pattern Matching | Standard Dev using Pattern Matching |
|---|---|---|
| 0 | 3.26 | 3.37 |
| 30 | 37.91 | 3.93 |
| 60 | 57.47 | 3.46 |
| 90 | 85.00 | 2.56 |
| 120 | 111.52 | 2.58 |
| 150 | 146.91 | 3.17 |
| 180 | 179.78 | 3.22 |
| 210 | 214.70 | 1.80 |
| 240 | 235.72 | 2.88 |
| 270 | 269.52 | 2.25 |
| 300 | 300.02 | 4.94 |
| 330 | 327.30 | 2.63 |

TABLE 2

Walk test data for User 2

| Walking Angle From Apparatus | Walking Angle using Pattern Matching | Standard Dev using Pattern Matching |
|---|---|---|
| 0 | 345.46 | 6.62 |
| 30 | 40.20 | 4.84 |
| 60 | 66.46 | 3.54 |
| 90 | 101.04 | 3.88 |
| 120 | 98.35 | 5.92 |
| 150 | 129.22 | 4.33 |
| 180 | 182.20 | 5.43 |
| 210 | 208.26 | 4.53 |
| 240 | 240.96 | 2.57 |
| 270 | 268.57 | 4.21 |
| 300 | 282.67 | 7.72 |
| 330 | 337.43 | 7.91 |

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for determining a walking direction for a pedestrian dead reckoning process comprising:
   determining that a person is in ambulatory motion;
   collecting accelerometer data in a device associated with the person while the person is in ambulatory motion;
   warping the accelerometer data in regions between anchor points identified in the accelerometer data to match locations of anchor points in the accelerometer data with locations of anchor points in an accelerometer reference pattern;
   determining forward and sideways movement patterns of the person from the warped accelerometer data; and
   determining a heading of the person by matching the determined forward and sideways movement patterns to stored reference patterns for forward and sideways movement during ambulatory motion without computing an orientation of the device from the collected accelerometer data.

2. The method according to claim 1, wherein the ambulatory motion is walking.

3. The method according to claim 1, wherein the ambulatory motion is jogging.

4. The method according to claim 1, wherein the ambulatory motion is running.

5. The method according to claim 1, wherein matching includes:
   identifying accelerometer data corresponding to a stride of the person in the collected accelerometer data;
   calculating a correlation sum between the identified accelerometer data and corresponding points in the reference pattern; and
   determining a motion angle using the correlation sum.

6. The method according to claim 1, wherein the accelerometer data comprises forward and sideways accelerometer data, and the reference pattern includes forward and sideways acceleration reference patterns.

7. The method according to claim 1, further comprising:
   selecting the reference pattern from a set of reference patterns.

8. The method according to claim 7, wherein selecting includes:

collecting an initial set of accelerometer data while the person is in motion; and performing a classification process against the set of reference patterns to identify the reference pattern.

9. The method according to claim 7, further comprising:

collecting reference accelerometer data in devices respectively associated with a plurality of persons while the persons are all engaged in the same type of ambulatory motion; and processing the reference accelerometer data to obtain the set of reference patterns.

10. The method according to claim 7, further comprising:

determining a location of the device with respect to the person's body; and using the determined location to select the reference pattern.

11. The method according to claim 5, wherein calculating a correlation sum includes calculating:

$$\tan\theta_\alpha = -\frac{\sum_T simFwdAcc[i]AccY[i]}{\sum_T simFwdAcc[i]AccX[i]},$$

wherein sinFwdAcc is a forward acceleration value from the reference pattern and, wherein $\Sigma_T$ represents the summation over all stored points within the stride T, and wherein AccX and AccY are the identified accelerometer data for sideways and forward acceleration, respectively, and wherein $\Theta_\alpha$ is the motion angle.

12. A method for determining a walking direction for a pedestrian dead reckoning process, comprising:

determining that a plurality of persons are in ambulatory motion;

collecting accelerometer data in devices respectively associated with each of the plurality of persons while the plurality of persons are all engaged in the same type of ambulatory motion;

warping the accelerometer data in regions between anchor points identified in the accelerometer data to match locations of anchor points in the accelerometer data with locations of anchor points in an accelerometer reference pattern;

determining respective forward and sideways movement patterns of each of the plurality of persons from the warped accelerometer sensor data; and determining a heading of each of the plurality of persons by matching the determined forward and sideways movement patterns of each of the plurality of persons to stored reference patterns for forward and sideways movement during ambulatory motion without computing orientations of the devices from the collected accelerometer data.

13. The method according to claim 12, wherein the ambulatory motion is walking.

14. The method according to claim 12, wherein the ambulatory motion is jogging.

15. The method according to claim 12, wherein the ambulatory motion is running.

16. The method according to claim 12, wherein determining respective forward and sideways movement patterns includes a vector clustering technique.

17. The method according to claim 12, wherein determining respective forward and sideways movement patterns includes:

extracting stride data from the accelerometer data;

generating stride vectors from the extracted stride data; and clustering the stride vectors to obtain a set of reference patterns.

18. The method according to claim 17, further comprising:

warping the extracted stride data to align the stride data with reference anchors before generating the stride vectors.

19. The method according to claim 17, further comprising:

determining whether saturation has occurred for a given number of reference vectors obtained after an iteration of clustering; and identifying the number of reference vectors as the set of reference patterns if saturation has occurred.

20. A method for determining a walking direction for a pedestrian dead reckoning process, comprising:

determining that a person is in ambulatory motion;

collecting accelerometer data in a device associated with the person while the person is in ambulatory motion;

warping the collected accelerometer data in regions between anchor points identified in the accelerometer data to match locations of anchor points in the collected accelerometer data with locations of anchor points in an accelerometer reference pattern; and processing the accelerometer data to determine a heading of the person, wherein processing includes matching the collected and warped accelerometer data to the reference pattern, without computing an orientation of the device from the collected accelerometer data.

21. The method according to claim 20, wherein the ambulatory motion is walking.

22. The method according to claim 20, wherein the ambulatory motion is jogging.

23. The method according to claim 20, wherein the ambulatory motion is running.

24. The method according to claim 20, wherein matching includes:

identifying accelerometer data corresponding to a stride of the person in the collected and warped accelerometer data;

calculating a correlation sum between the identified accelerometer data and corresponding points in the reference pattern; and determining a motion angle using the correlation sum.

25. The method according to claim 20, wherein the accelerometer data comprises forward and sideways accelerometer data, and the reference pattern includes forward and sideways acceleration reference patterns.

26. A mobile device, comprising:

an accelerometer; and a processor, coupled to the accelerometer and configured with processor-executable instructions to perform operations comprising:

determining that a person is in ambulatory motion;

collecting accelerometer data in a device associated with the person while the person is in ambulatory motion;

warping the accelerometer data in regions between anchor points identified in the accelerometer data to match locations of anchor points in the accelerometer data with locations of anchor points in an accelerometer reference pattern;

determining forward and sideways movement patterns of the person from the warped accelerometer data; and determining a heading of the person by matching the determined forward and sideways movement patterns to stored reference patterns for forward and sideways movement during ambulatory motion without computing an orientation of the device from the collected accelerometer data.

27. A mobile device, comprising:

an accelerometer; and a processor, coupled to the accelerometer and configured with processor-executable instructions to perform operations comprising:

determining that a plurality of persons are in ambulatory motion;

collecting accelerometer data in devices respectively associated with each of the plurality of persons while the plurality of persons are all engaged in the same type of ambulatory motion;

warping the accelerometer data in regions between anchor points identified in the accelerometer data to match locations of anchor points in the accelerometer data with locations of anchor points in an accelerometer reference pattern;

determining respective forward and sideways movement patterns of each of the plurality of persons from the warped accelerometer sensor data; and     determining a heading of each of the plurality of persons by matching the determined forward and sideways movement patterns of each of the plurality of persons to stored reference patterns for forward and sideways movement during ambulatory motion without computing orientations of the devices from the collected accelerometer data.

28. A mobile device, comprising:

an accelerometer; and a processor, coupled to the accelerometer and configured with processor-executable instructions to perform operations comprising:

determining that a person is in ambulatory motion;

collecting accelerometer data in a device associated with the person while the person is in ambulatory motion;

warping the collected accelerometer data in regions between anchor points identified in the accelerometer data to match locations of anchor points in the collected accelerometer data with locations of anchor points in an accelerometer reference pattern; and     processing the accelerometer data to determine a heading of the person, wherein processing includes matching the collected and warped accelerometer data to the reference pattern, without computing an orientation of the device from the collected accelerometer data.

* * * * *